Patented Nov. 7, 1922.

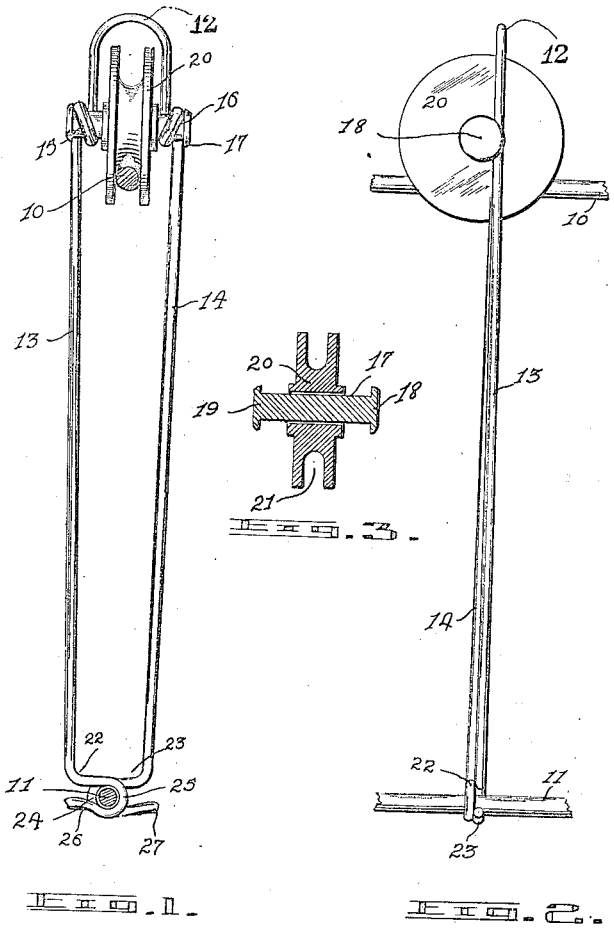

1,434,377

UNITED STATES PATENT OFFICE.

JEAN CHARLES EMOND, OF HAWKESBURY, CANADA.

PULLEY COUPLING FOR CLOTHESLINES.

Application filed November 26, 1920. Serial No. 426,598.

*To all whom it may concern:*

Be it known that I, JEAN CHARLES EMOND, a citizen of the Dominion of Canada, residing at Hawkesbury, in the county of Prescott and Province of Ontario, Canada, have invented certain new and useful Improvements in Pulley Couplings for Clotheslines, of which the following is a specification.

The present invention relates to a pulley coupling for clothes lines and the principal object is to provide a novel and improved means for supporting the line, intermediate its length, whereby sagging is obviated.

Another object is to provide a novel and improved structure whereby the line, with the clothes attached thereto, can be quickly and easily run in or out, without the necessity of walking from place to place, to hang the clothes or remove the same from the line.

With these and other objects in view, the invention consists in the construction, combination and arrangements of parts as will be hereinafter fully described, illustrated in the accompanying drawings, and pointed out in the claim hereunto appended.

Figure 1 is a front elevational view of the device, illustrating its attachment to the clothes line.

Fig. 2 is a side elevation of the same, and Fig. 3 is a vertical axial section of the sheave.

Referring to the drawings like numerals designate like parts in the various drawings.

The numeral 10 represents the upper lap and 11 the lower lap of an endless clothes line, which may engage over suitable pulleys, or two independent lines may be used.

A plurality of suspension devices 12 are adapted for engagement on cable line 10 and each of said devices comprise a single length of spring wire bent intermediate its end, to form the spring arms 13 and 14. Contiguous to the bent over portion of the device, the arms 13 and 14 are looped to form the oppositely disposed eyes 15 and 16. Arranged in the eyes 15 and 16 of the suspension device 12, is a pin 17, having its ends upset at 18 and 19, whereby the same is held against transverse movement in the said suspension device. A sheave 20 is revolubly mounted on the pin 17 and is formed with a deep groove 21 adapted for the reception of the cable line 10 on which it is arranged to travel.

The lower parts of the spring arms 13 and 14, are formed with clamp hooks 22 and 23, the bowed portions 24 and 25 of which are directed inwardly toward each other, while the extreme end portions 26 and 27 extend upward and outwardly.

The lower cable line 11 is adapted to be received within the bowed portions 24 and 25 of the clamp hooks 22 and 23 as clearly illustrated in Fig. 1, and to permit such insertion, the spring arms 13 and 14 are pushed together in such manner as to cross one of the hook members over the other.

The manner in which this pulley coupling is applied is as follows: An operator working at one end of the endless clothes line, will hang on the lower lap 11 of the same, the garments to be held suspended therefrom, until twelve or fifteen feet, (more or less) of said line is filled, when he will apply one of these pulley couplings to the clothes line by first passing the upper line 10 through the lower part of the spring arms 13 and 14, then dropping the device down until the groove 21 of the sheave 20 rides on the upper line 10. Then he will raise the lower line 11 and press the spring arms 13 and 14 together to allow the line 11 to be inserted within the hooks 22 and 23. The operator will then proceed to fill another twelve or fifteen feet of the lower line 11 and apply a second pulley coupling in substantially the same manner, and will thus proceed until the line is filled as far as desired. When these pulley-couplings have been applied as above described, the operator can easily move this endless clothesline, though loaded with clothes through the end rollers, as the sheave of this device will readily and freely travel on the upper line 10, through its clamping hooks 22 and 23 holds with the body of the lower line 11. A reversal of operations will enable the operator to remove the device.

From the foregoing it is thought that the construction of my invention will be clearly understood, and, therefore, a more extended explanation has been omitted.

Having thus described my invention, what I claim as new is:—

A support to be used in connection with a clothes-line having an upper and a lower run, constructed of a single length of wire bent intermediate its ends to form spring arms, said arms contiguous to the bend being looped to form oppositely disposed eyes to receive a transverse pintle of a sheave, and the ends of the said arms formed with clamp hooks the bowed portions of which extend transversely of the arms and are overlapped to engage upon opposite sides of the lower run of the clothes-line which latter is thus resiliently but positively retained therein.

In testimony whereof I affix my signature in the presence of two witnesses.

J. CHARLES EMOND.

Witnesses:
J. M. BERTRAND,
OTTO D. SAUCIER.